(12) United States Patent  
Roth

(10) Patent No.: US 12,442,351 B2
(45) Date of Patent: Oct. 14, 2025

(54) CYLINDER HEAD FOR AN INTERNAL COMBUSTION ENGINE AND AN INTERNAL COMBUSTION ENGINE WITH SUCH A CYLINDER HEAD

(71) Applicant: DEUTZ Aktiengesellschaft, Cologne (DE)

(72) Inventor: Thomas Roth, Rösrath (DE)

(73) Assignee: Deutz Aktiengesellschaft, Cologne (DE)

( * ) Notice: Subject to any disclaimer, the term of this patent is extended or adjusted under 35 U.S.C. 154(b) by 0 days.

(21) Appl. No.: 18/544,800

(22) Filed: Dec. 19, 2023

(65) Prior Publication Data

US 2024/0209814 A1 Jun. 27, 2024

(30) Foreign Application Priority Data

Dec. 23, 2022 (DE) .......................... 102022004896.5

(51) Int. Cl.
*F02M 21/02* (2006.01)
*F02M 61/18* (2006.01)

(52) U.S. Cl.
CPC .... *F02M 21/0278* (2013.01); *F02M 61/1806* (2013.01)

(58) Field of Classification Search
CPC ........... F02M 21/0278; F02M 61/1806; F02M 61/141; F02B 23/104; F02B 31/06; F02B 43/02
See application file for complete search history.

(56) References Cited

U.S. PATENT DOCUMENTS

| 4,070,826 A * | 1/1978 | Stenger ................. F23D 11/106 |
| | | 239/425 |
| 5,707,012 A | 1/1998 | Maier et al. |
| 8,950,383 B2 * | 2/2015 | Sperry ................. F02M 21/042 |
| | | 48/189.4 |
| 2014/0084085 A1 | 3/2014 | Hongo et al. |

FOREIGN PATENT DOCUMENTS

| EP | 0 694124 B1 | 3/1999 |
| JP | 2003-214259 A | 7/2003 |
| WO | WO2016169712 A | 10/2016 |
| WO | WO2017089042 A1 | 6/2017 |
| WO | WO 2019/147963 A1 | 8/2019 |

OTHER PUBLICATIONS

U.S. Appl. No. 18/544,728, filed Dec. 19, 2023.
U.S. Appl. No. 18/544,800, filed Dec. 19, 2023.

* cited by examiner

*Primary Examiner* — Syed O Hasan
(74) *Attorney, Agent, or Firm* — Davidson Kappel LLC

(57) ABSTRACT

A cylinder head for an internal combustion engine including a cylinder head arrangement having an intake port, an injector connected to the cylinder head arrangement, and a tubular injection tube extending along a tube core axis into the intake port and fluidly connected to the injector, an attachment element being arranged on the injection tube, and the attachment element having an air guiding portion which extends radially outwards with respect to the tube core axis in such a way that a flow in the intake port is influenced by the air guiding portion.

7 Claims, 2 Drawing Sheets

CYLINDER HEAD FOR AN INTERNAL COMBUSTION ENGINE AND AN INTERNAL COMBUSTION ENGINE WITH SUCH A CYLINDER HEAD

This claims the benefit of a German Patent Application DE 10 2022004896.5, filed on Dec. 23, 2022 which is hereby incorporated by reference herein.

The present disclosure relates to a cylinder head for an internal combustion engine and an internal combustion engine with such a cylinder head.

BACKGROUND

The cylinder head of internal combustion engines delimits the combustion chambers on the side opposite the piston and regularly includes the intake and exhaust ports as well as the valve control for the gas exchange processes in the internal combustion engine. In engines with intake port injection, fuel is injected into the intake port such that a mixture of the fuel and the intake air is formed in the intake port.

SUMMARY

An internal combustion engine with intake port injection is known from EP 0 694 124 B1, in which fuel is injected into the intake port via a tube.

At the end that opens into the intake port, the tube includes an atomizing screen that atomizes the fuel flowing out of the tube to improve mixture. This has the disadvantage that the atomizing screen can become clogged during continuous operation and the fuel supply is impaired. In addition, fuel can be retained in the tube by the atomizing screen, so that unintentional re-ignition can occur in the tube, especially when using hydrogen as fuel.

An internal combustion engine with an injector is known from US 2014/0 084 085 A1, wherein the injector comprises a nozzle element and a mixing section.

Based on the above, the present disclosure is based on the task of providing a cylinder head for an internal combustion engine and an internal combustion engine with such a cylinder head, which enables a permanently favorable mixture in the intake port.

To solve the problem, a cylinder head for an internal combustion engine, in particular for a hydrogen-powered internal combustion engine, is proposed, comprising a cylinder head arrangement which includes an intake port, an injector which is connected to the cylinder head arrangement, and a tubular injection tube which extends along a tube core axis into the intake port and is fluidly connected to the injector, wherein an attachment element is arranged on the injection tube, and the attachment element having an air guiding portion which extends radially outwards with respect to the tube core axis in such a way that a flow in the intake port is influenced by the air guiding portion.

The radially outwardly projecting air guiding portion generates an increased turbulent flow in the intake air downstream of the air guiding portion, wherein the turbulent flow improves mixing of the intake air with the fuel injected into the intake port via the injection tube. Due to the radially outward extending of the air guiding portion, the injection tube is not blocked by the air guiding portion, so that the injection tube is neither clogged as operation progresses nor is fuel retained by it in the injection tube.

The intake port constitutes the concluding part of the engine's air induction system. The intake port connects the intake manifold with the combustion chamber and are opened and closed with the intake valves.

In principle, the injector is also functional without the injection tube. The injection tube shifts the point at which the fuel enters the flow in the intake port from the wall delimiting the intake port towards the center of the intake port. The injection tube must therefore be considered separately from the components of the injector that are necessary for its general function.

In a possible embodiment, a radial extension of the air guiding portion with respect to the tube core axis can be greater than an axial extension in the direction of the tube core axis. In other words, the air guiding portion can be disc-shaped, respectively the air guiding portion can be designed as an air guiding disc. Herein, the extension of the air guiding portion along a circumference around the tube core axis can be greater than the radial extension with respect to the tube core axis.

In a further possible embodiment, the injection tube can have an injection aperture that opens into the intake port.

The air guiding portion or the air guiding disc can in particular be circular in shape. The air guiding portion or the air guiding disc can have a through-opening, wherein the longitudinal axis of the through-opening is arranged coaxially to the tube core axis. The through-opening of the air guiding disc can be circular and can have a diameter that is greater than or equal to the diameter of the injection aperture. In other words, the air guiding portion and the respective through-opening can be shaped such that the injection aperture and the attachment element do not overlap in a direction of the tube core axis, in particular in a direction of the tube core axis at the injection aperture.

In a further embodiment, the attachment element can have a first connecting portion with which the attachment element is arranged on the injection tube. The attachment element can have an internal thread that engages in an external thread of the injection tube. Alternatively, the attachment element can be press-fitted onto the injection tube, or the attachment element and the injection tube can be designed in one piece.

The air guiding portion can extend radially outwards from the first connecting portion in relation to the tube core axis. Alternatively, the air guiding portion can be arranged adjacent to the connecting portion in an axial direction along the tube core axis and can extend radially outwards in relation to the tube core axis.

An embodiment is possible in which the smallest cylindrical envelope of the first connecting portion, whose cylindrical axis is arranged coaxially to the tube core axis, has a smaller radius than the largest radial extension of the air guiding portion from the tube core axis.

To solve the problem, also an internal combustion engine is proposed which comprises a cylinder head in a previously described configuration.

BRIEF SUMMARY OF THE DRAWINGS

Possible embodiments of a cylinder head respectively of an internal combustion engine according to the present disclosure are explained below with reference to the figures.

DETAILED DESCRIPTION

Figure 1:
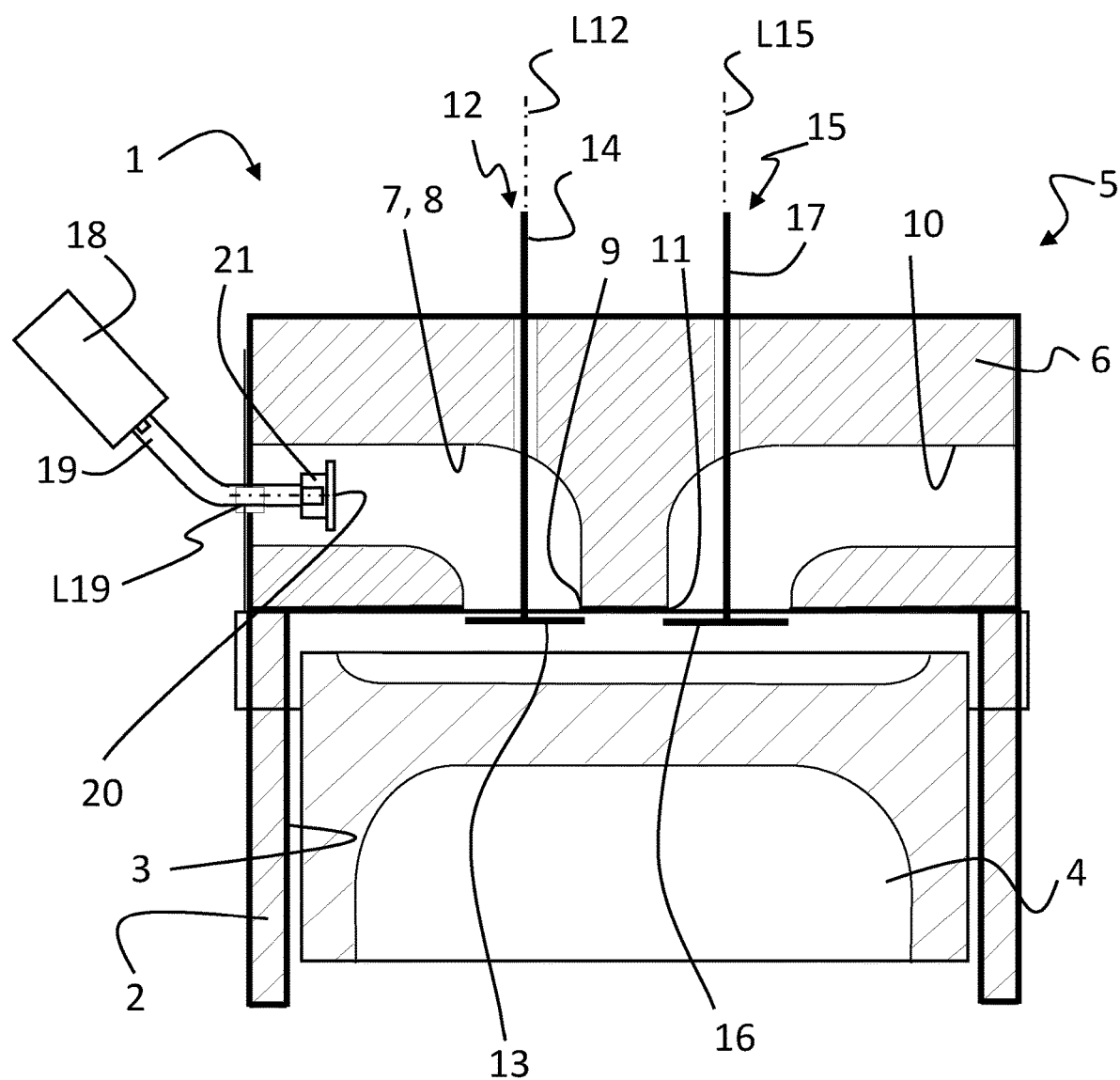
FIG. 1 is a schematic representation of a partial sectional view of an internal combustion engine with a first cylinder head according to the present disclosure.

FIGS. 1 to 4, which are described together below, show an internal combustion engine 1. In particular, the internal combustion engine 1 is operated with hydrogen as fuel. The internal combustion engine 1 comprises a crankcase 2, which is connected to a cylinder head 5 according to the present disclosure. In a known manner, the crankcase 2 comprises a variable combustion chamber 3, which is delimited by a movable piston 4 and the cylinder head 5. The cylinder head 5 comprises a cylinder head arrangement which has a cylinder head base element 6 and a cylinder head cover, not shown, which are connected to one another.

An intake port 7 and an exhaust port 10 are cast into the cylinder head base element 6. An air-fuel mixture can be fed into the combustion chamber 3 via intake port 7. The intake port 7 has a wall 8 respectively is delimited by a wall 8 and comprises a combustion chamber inlet aperture 9, which opens in the direction of the combustion chamber 3. The combustion chamber inlet aperture 9 can be reversely opened or closed in a known manner by an inlet valve 12. For this purpose, the inlet valve 12 comprises an inlet valve disc 13, which is arranged in a valve seat of the combustion chamber inlet aperture 9 when the combustion chamber inlet aperture 9 is to be closed, and an inlet valve stem 14, which extends substantially cylindrically along a valve axis L12. The inlet valve 12 can be moved along the valve axis L12 by a corresponding valve train, which is arranged above the cylinder head base element 6.

The exhaust gases produced by the combustion of the air-fuel mixture in the combustion chamber 3 can flow out of the combustion chamber 3 via the exhaust port 10. The exhaust port 10 has a wall respectively is delimited by a wall and comprises a combustion chamber exhaust aperture 11, which opens in the direction of the combustion chamber 3. The combustion chamber exhaust aperture 11 can be reversely opened or closed as desired in a known manner by an exhaust valve 15. For this purpose, the exhaust valve 15 comprises an exhaust valve disc 16, which is arranged in a valve seat of the combustion chamber exhaust aperture 11 when the combustion chamber exhaust aperture 11 is to be closed, and an exhaust valve stem 17, which extends substantially cylindrically along a valve axis L15. The exhaust valve 15 can be moved along the valve axis L15 by the valve train.

To form the mixture of air and fuel, fuel is injected into the intake port 7 via an injector 18, which is connected to the cylinder head arrangement, in particular to the cylinder head base element 6, via connecting means not shown. For this purpose, an outlet of the injector 18 is fluidly connected to an injection tube 19, which extends along a tube core axis L19 into the intake port 7. The injection tube 19 comprises an injection aperture 20, which opens into the intake port 7. In the present case, the injection tube 19 is formed angled and comprises a first straight end portion on the side of the injector 18 and a second straight end portion on the side of the injection aperture 20, which are connected to each other via a curved portion. The tube core axis L19 extends completely from one end of the injection tube 19 to the opposite end, whereby the tube core axis L19 is only shown in the area of the second end portion in FIG. 1 for the sake of clarity. It is also conceivable that the tube core axis can take on any other shape, such as being completely straight or S-shaped.

Figure 2:
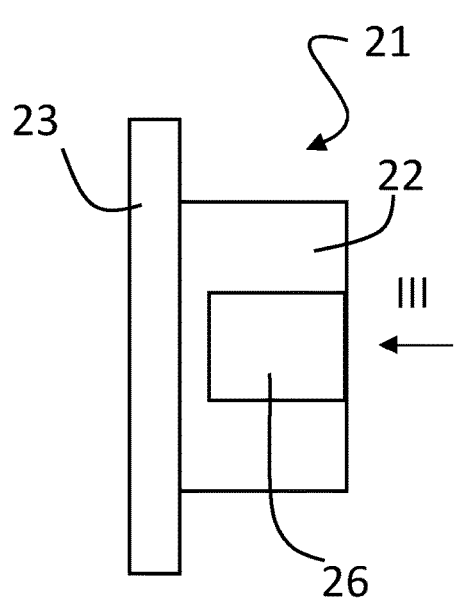
FIG. 2 is a side view of the attachment element from FIG. 1.
Figure 3:
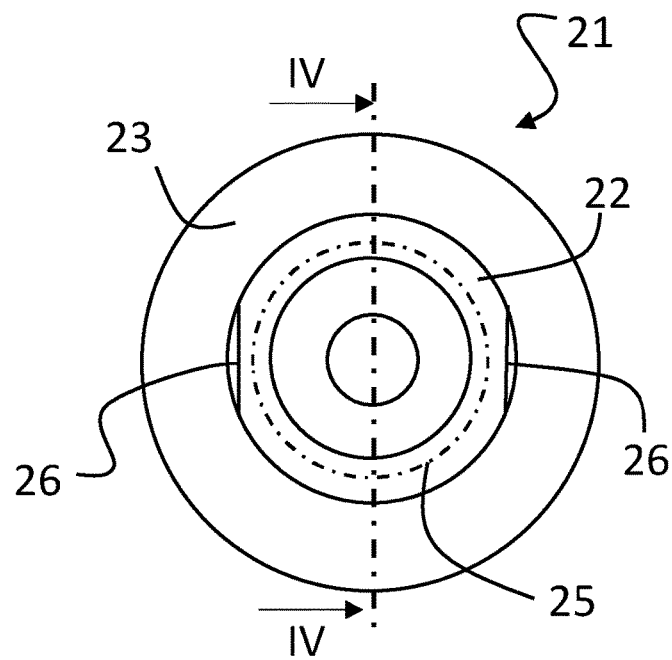
FIG. 3 is a view of the attachment element of FIG. 1 in the direction of arrow III in FIG. 2.
Figure 4:
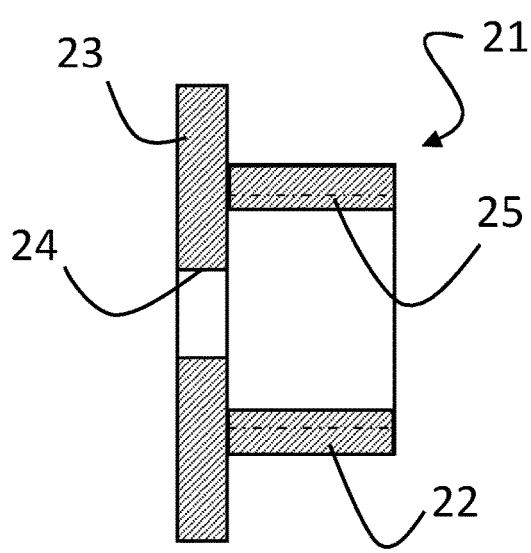
FIG. 4 is a sectional view of the attachment element along the sectional line IV-IV from FIG. 3.

A first attachment element 21, which is shown in detail in FIGS. 2 to 4, sits on the injection tube 19 in the area of the second end portion. The first attachment element 21 comprises an annular first connecting portion 22, the inner contour of which is complementary to the outer contour of the injection tube 19. The first attachment element 21 is firmly connected to the injection tube 19. In the present case, the first attachment element 21 is screwed onto the injection tube 19. For this purpose, the attachment element 21 comprises a cylindrical connecting portion 22, into which an internal thread 25 is incorporated. The attachment element 21 is seated with the connecting portion 22 on the second end portion of the injection tube 19, with the internal thread 25 engaging with a complementary external thread of the injection tube 19, which is not shown. For screwing the attachment element 21 onto the connecting tube 19, the connecting portion 22 has tool engagement surfaces 26 which are designed to complement a screwing tool, for example an open-end wrench or the like.

However, it is also conceivable that the two parts are joined in some other way, for example by soldering, gluing or press-fitting. In principle, it is also conceivable that the attachment element 21 and the injection tube 19 are designed in one piece.

An air guiding portion 30 adjoins the connecting portion 22 along the tube core axis L19. When the attachment element 21 is mounted on the injection tube 19, the air guiding portion 23 comes into axial contact with the injection tube 19.

The air guiding portion 23 is designed as an air guiding disc, the extent of which in the direction of the tube core axis L19 is smaller than the radial extent with respect to the tube core axis L19. In the present case, the air guiding portion 23 is designed to be cylindrical on the outside, without being limited to this, and has a larger external diameter than the connecting portion 22. In other words, the air guiding portion 23 protrudes beyond the connecting portion 22 in the radial direction with respect to the tube core axis L19.

The air guiding portion 23 comprises an through-opening 24, which is in particular cylindrical and has an aperture diameter. The longitudinal axis of the through-opening 24 is arranged coaxially to the tube core axis L19. The diameter of the through-opening 24 is greater than or equal to the diameter of the injection aperture 20, so that fuel can flow freely out of the injection tube 19.

The air guiding portion 23 reduces the effective cross-section of the intake port 7 locally, so that turbulence occurs behind the air guiding portion 23 in the direction of flow of the intake air, which favors the formation of a mixture of intake air and injected fuel.

In the present disclosure, the attachment element 21 is arranged outside an imaginary straight cylinder, the base surface of which is described by the inlet valve plate 13 and extends along the valve axis L12. This ensures that the fuel-air mixture is sufficiently mixed when it enters the combustion chamber 3.

Furthermore, due to the acting Venturi effect the acting pressure is reduced directly behind the air guiding portion 23, so that any remaining fuel in the injection tube 19 is sucked out of the injection tube 19 and no fuel or air-fuel mixture can flow back into the injection tube 19. This prevents the unintentional re-ignition of fuel in the injection tube 19.

LIST OF REFERENCE SIGNS

1 Internal combustion engine
2 Crankcase

3 Combustion chamber
4 Piston
5 Cylinder head
6 Cylinder head base element
7 intake port
8 Wall
9 Combustion chamber inlet aperture
10 Exhaust port
11 Combustion chamber exhaust aperture
12 Inlet valve
13 Inlet valve disc
14 Inlet valve stem
15 Exhaust valve
16 Exhaust valve disc
17 Exhaust valve stem
18 Injector
19 Injection tube
20 Injection aperture
21 Attachment element
22 Connecting portion
23 Air guiding portion
24 Through-opening
25 Internal thread
26 Tool engagement surface
L19 Tube core axis
L12 Valve axis
L15 Valve axis

What is claimed is:

1. A cylinder head for an internal combustion engine comprising:
a cylinder head arrangement which has an intake port;
an injector connected to the cylinder head arrangement;
a tubular injection tube, which extends along a tube core axis into the intake port and is fluidly connected to the injector, wherein the injection tube has an injection aperture which opens into the intake port; and
an attachment element arranged on the injection tube, the attachment element having an air guiding portion formed as an air guiding disc with circular ring shape which extends perpendicular to the tube core axis, and the air guiding portion is configured to influence a flow of air in the intake port,
wherein the air guiding disc has a through-opening having a longitudinal axis coaxial to the tube core axis and having a diameter that is greater than or equal to a diameter of the injection aperture.

2. The cylinder head according to claim 1, wherein a radial extension of the air guiding portion with respect to the tube core axis is greater than an axial extension.

3. The cylinder head according to claim 1, wherein the attachment element has a first connecting portion, with which the attachment element is arranged on the injection tube, wherein the air guiding portion extends from the first connecting portion radially outwards with respect to the tube core axis.

4. The cylinder head according to claim 3, wherein a smallest cylindrical envelope of the first connecting portion, whose cylindrical axis is arranged coaxially to the tube core axis, has a smaller radius than a largest radial extent of the air guiding portion from the tube core axis.

5. The cylinder head according to claim 1, wherein the air guiding disc is arranged adjacent to a first connecting portion in a direction of the tube core axis.

6. The cylinder head according to claim 1, wherein the attachment element has an internal thread which engages in an external thread of the injection tube.

7. An internal combustion engine comprising a cylinder head according to claim 1.

* * * * *